United States Patent [19]

Sessa et al.

[11] Patent Number: 4,980,400

[45] Date of Patent: Dec. 25, 1990

[54] BISPHENOL FORMALDEHYDE EPOXY-BASED FLOORING AND COATING MATERIALS

[75] Inventors: Frank C. Sessa, Wyncote; Carolyn E. Massey, Philadelphia, both of Pa.

[73] Assignee: Stonhard, Maple Shade, N.J.

[21] Appl. No.: 257,976

[22] Filed: Oct. 14, 1988

[51] Int. Cl.$^5$ .................. C08K 3/36; C08L 63/02
[52] U.S. Cl. .................. 523/443; 523/456; 523/466; 524/914; 525/523; 528/103; 260/998.15
[58] Field of Search ............ 523/443, 466, 456; 525/523; 524/914; 528/103; 260/998.15

[56] References Cited

U.S. PATENT DOCUMENTS

| | | | |
|---|---|---|---|
| 3,174,977 | 3/1965 | Hoiberg et al. | 523/466 |
| 3,265,647 | 8/1966 | Schaeffer et al. | 524/914 |
| 4,051,195 | 9/1977 | McWhorter | 528/106 |
| 4,159,976 | 7/1979 | Moran | 523/456 |
| 4,189,548 | 2/1980 | Sakashita et al. | 523/450 |
| 4,487,805 | 12/1984 | Sellstrom | 523/456 |
| 4,721,743 | 1/1988 | Cavitt et al. | 528/103 |
| 4,753,826 | 6/1988 | Lauman | 523/466 |
| 4,829,134 | 5/1989 | Sakamoto et al. | 525/523 |

FOREIGN PATENT DOCUMENTS 59-045365  3/1984  Japan .................. 523/443

OTHER PUBLICATIONS

Chemical Week—Jan. 15, 1986, P14–16, "The Search for an MDA Stand-in".
CAB-O-Sil TS-720—Technical Specification pp. 5–8.
Technical Bulletin—Shell Chemical Company, Jan., 1983, "EPON Resin 825".
Preliminary Technical Bulletin—Shell Chemical Company, Sep. 1987, "EPON RESIN DPL-862".
Technical Bulletin—Sartomer Company, May, 1980, "SR-351 Trimethylolpropane Triacrylate".
Stonclad GS—Product Data, 1987.
Stonclad GS—Specifications, 1987.
Stonclad HT—Product Data, 1987.
Stonclad HT—Specifications, 1987.
Stonclad HT—Chemical Resistance Guide, Jun., 1987.

*Primary Examiner*—Lewis T. Jacobs

[57] ABSTRACT

A trowelable, epoxy-based flooring material exhibits high impact strength, high chemical resistance and a closed exposed surface after curing, and has a hardener component including aliphatic amine and amino silane, a resin component including bisphenol formaldehyde epoxy and monoepoxide and an aggregate component, with the hardener and the resin being present in stoichiometric proportion.

42 Claims, No Drawings

BISPHENOL FORMALDEHYDE EPOXY-BASED FLOORING AND COATING MATERIALS

FIELD OF THE INVENTION

This invention relates to trowelable flooring and coating materials.

BACKGROUND OF THE INVENTION—DESCRIPTION OF THE PRIOR ART

Trowelable, epoxy-based flooring materials are known to generally include hardener, resin and aggregate. One commercially successful trowelable epoxy-based flooring material utilizes bisphenol acetone-based epoxy as the resin.

Known bisphenol acetone epoxy-based flooring materials often contain several components in addition to the hardener and the epoxy. These components include aggregates (such as sand), as well as pigments, diluents, monoepoxide and other additives.

Bisphenol formaldehyde based epoxy resin is marketed by Shell Chemical Company as EPON Resin DPL-862. A preliminary technical bulletin issued by Shell asserts that chemical resistance properties can be obtained. However, that bulletin does not disclose hardener systems to be used with the bisphenol epoxy to obtain chemical resistance properties.

While trowelable epoxy-based floorings and epoxy-based coatings, and especially bisphenol acetone epoxy-based floorings, have received wide commercial acceptance, the need nevertheless remains for flooring and coating materials exhibiting, higher impact strength and even higher chemical resistance, for use in industrial environments, particularly where heavy impact loading can be anticipated and where spills of caustic or other highly reactive chemicals cannot be avoided. These needed floorings and coatings must also present a closed exposed surface to facilitate cleanup and maintenance.

SUMMARY OF THE INVENTION

This invention provides epoxy-based materials useful as floorings or coatings. The materials exhibit high impact strength and high chemical resistance and present a closed exposed surface after curing in place. The epoxy-based flooring and coating materials include
i. a hardener component,
ii. a resin component and
iii. an aggregate component. The hardener and the resin are present in approximately stoichiometric proportions based on the hardener-epoxy reaction (typically, about nineteen (19) parts by weight hardener to about one hundred (100) parts by weight resin).

The hardener preferably includes an aliphatic amine and amino silane. The aliphatic amine preferably is selected from the group consisting of diethylene triamine, triethylene tetramine, tetra ethylene pentamine and cycloaliphatic amines. The aliphatic amine is preferably devoid of free amine.

The preferred amino silane is gamma amino propylxylene available as Dow Corning Z6020.

The hardener component preferably contains about eighty-five percent (85%) to about ninety-five percent (95%) aliphatic amine and about five percent (5%) to about fifteen percent (15%) amino silane, both by weight of the hardener component.

The invention embraces two principal, alternative embodiments for the resin component. In both of these alternative embodiments the resin includes bisphenol formaldehyde epoxy, such as Shell Chemical's EPON Resin DPL-862.

In one of these resin component embodiments the resin includes a monoepoxide portion in addition to the bisphenol formaldehyde epoxy. The monoepoxide portion preferably includes monoepoxide selected from the group consisting of cresyl glycidyl ether, butyl glycidyl ether, resorcinyl glycidyl ether and a mixture of $C_{12}$–$C_{14}$ monoepoxides. In this resin component embodiment there is preferably from about eighty-eight percent (88%) to about ninety percent (90%) bisphenol formaldehyde epoxy and from about ten percent (10%) to about twelve percent (12%) monoepoxide, both by weight of resin component.

In the other resin component embodiment, the resin component includes bisphenol formaldehyde epoxy and at least one organic compound selected from the group consisting of benzyl alcohol, isopropyl alcohol, furfural alcohol, methanol, ethanol, toluene and xylene. In this resin component embodiment, there is preferably from about eighty-five percent (85%) to about ninety-five percent (95%) bisphenol formaldehyde epoxy, and from about five percent (5%) to about fifteen percent (15%) of at least one of the organic compound(s), both of these being by weight of the resin component.

Regardless of which of the resin component embodiments are used, the flooring and coating materials of the invention contain an aggregate component. As a coating, the epoxy-based materials of the invention preferably include a fine particle size aggregate. One such preferred fine particle size aggregate is fumed silica such as CAB-O-SIL TS-720, marketed by Cabot Industries, having particle size in the millimicron range.

As a flooring, epoxy-based materials of the invention include an aggregate having coarse and/or fine particle size materials. The flooring materials have a weight ratio of aggregate component to combined hardener and resin components ranging from about five (5) parts aggregate to one (1) part combined hardener and resin, to about 8.5 parts aggregate to about one (1) part combined hardener and resin. A preferred weight ratio is about 6.6 parts aggregate to one (1) part combined hardener and resin.

A preferred coarse aggregate is silica sand. The sand preferably has at least about fifty percent (50%) by weight of a first portion of silica, with at least about ninety percent (90%) of that first portion being between twenty (20) and thirty (30) U.S. Sieve size. The sand preferably has at least about forty percent (40%) by weight of a second portion of silica, with at least about ninety percent (90%) of that second portion being between about forty (40) and fifty (50) U.S. Sieve size. The sand preferably has a third portion of silica, amounting to less than about five percent (5%) of the total weight of sand, with at least about ninety percent (90%) of that third portion being between one hundred forty (140) and two hundred (200) U.S. Sieve size. The sand preferably has a fourth portion of silica, amounting to less than about five percent (5%) by weight of the total weight of sand, with at least about ninety percent (90%) of that fourth portion being three hundred twenty-five (325) or greater U.S. Sieve size.

In both the flooring and coating aspects of this invention, the aggregate component may also include pigment(s) selected from a variety of materials. Pigment may be added in an amount effective to alter the coating or flooring material color from the unpigmented color, i.e. to achieve a desired color. For the flooring materials, the pigment(s) preferably form no more than two percent (2%) by weight of the aggregate component.

When installed the flooring materials preferably have a thickness of about one-eighth inch to about 1.5 inches.

The flooring and coating materials of the invention may additionally contain rheological modifiers, anti-settling agents, air release agents, diluents, and dispersing agents.

DESCRIPTION OF THE PREFERRED EMBODIMENTS

In a preferred version of the first embodiment of the invention as a whole, the hardener component comprises about ninety percent (90%) aliphatic amine and about ten percent (10%) amino silane, both by weight of the hardener component, while the resin component comprises about ninety percent (90%) bisphenol formaldehyde epoxy and about ten percent (10%) monoepoxide, both by weight of the resin component. In the first embodiment, the preferred monoepoxide is the blend of $C_{12}$ to $C_{14}$ monoepoxides sold by Trimont Chemical Company as TC 748.

In a preferred version of the second embodiment of the invention as a whole, the hardener component comprises about ninety-five percent (95%) aliphatic amine and about five percent (5%) amino silane, both by weight of the hardener component, while the resin component comprises about eighty-eight percent (88%) bisphenol formaldehyde epoxy and about twelve percent (12%) benzyl alcohol, both by weight of the resin component.

When the invention materials are used as flooring, the preferred aliphatic amine for the hardener component is an isolated amine adduct marketed by Henkel A. G. as Versamine I-70. This amine product is apparently largely diethylene triamine.

When the invention materials are used as coatings, the preferred aliphatic amine includes a cycloaliphatic amine adduct, such as marketed by Trimont Chemical as TC-SHH.

The flooring and coating materials formulated according to the foregoing statement of the invention exhibit surprising and unexpected strength, as compared to known bisphenol acetone-based resin component flooring materials, when exposed to concentrated sulfuric acid and tested for flexural strength using ASTM standard test D543. The flooring product is trowelable, and the flooring material exhibits flexural strength equal to or slightly better than known epoxy floor materials, particularly epoxy floorings based on bisphenol acetone, prior to exposure to sulfuric acid or other caustic chemicals. When exposed to sulfuric acid or caustic chemicals, the flooring products of this invention exhibit surprising and unexpected increased flexural strength, relative to the bisphenol acetone-based epoxy floorings. Similar performance is anticipated for the coating products of this invention.

Chemical Resistance 7 Day Immersion Test

The chemical resistance 7 day immersion test followed the procedures of ASTM D543 and compared performance of a prior art flooring to floorings made according to the first and second embodiment of the invention.

The prior art flooring sample used in the test had a hardener consisting of approximately seventy-six percent (76%) of an aliphatic amine blend, fifteen percent (15%) of an aromatic solvent and nine percent (9%) pine oil, all by weight of hardener; a resin consisting of eighty-two percent (82%) bisphenol acetone epoxy and eighteen percent (18%) TC 748 monoepoxide, both by weight of resin; and a sand aggregate having particle size distribution as set forth above as the "preferred coarse aggregate" in the section "Summary of the Invention". The hardener and the resin were in stoichiometric portions, i.e. twenty-two (22) parts by weight hardener per one hundred (100) parts by weight resin. The sand aggregate was present in a weight ratio of sand aggregate to the combination of resin and hardener of 6.6 to one (1.0).

The flooring sample, prepared according to the first embodiment of the invention, as used and in the test had a hardener consisting of ninety percent (90%) Versamine I-70 aliphatic amine and ten percent (10%) Dow Corning Z6020 amino silane, both by weight of hardener; a resin consisting of ninety percent (90%) bisphenol formaldehyde epoxy and ten percent (10%) TC 748 monoepoxide, both by weight of resin; and a sand aggregate having the same preferred particle size distribution as the prior art flooring described in the preceding paragraph. The hardener and the resin were in stoichiometric portions, i.e., nineteen (19) parts by weight hardener per one hundred (100) parts by weight resin. The sand aggregate was present in a weight ratio of sand aggregate to the combination of resin and hardener of 6.6 to one (1.0).

The flooring sample, prepared according to the second embodiment of the invention, as used in the test was the same as the sample of the first embodiment of the invention as used in the test, except that benzyl alcohol replaced the monoepoxide.

Samples of the three different flooring materials were prepared. The samples were conditioned at 23° C. plus or minus 2° C. and at 50% plus or minus 5% relative humidity for 40 hours, in different containers, containing different reagents. Each sample was immersed in the reagent for seven days at ambient conditions. The reagents were 5% acetic acid solution, ethyl acetate, 40% nitric acid solution, methanol and concentrated sulfuric acid.

The samples were then tested for flexural strength and stiffness. These results as well the flexural strength and stiffness results for control samples (not immersed in any of the reagents) are shown in Table 1. It can be seen from these results that the sample flooring according to the second embodiment of the invention had unexpectedly superior resistance to concentrated sulfuric acid.

TABLE 1

| CHEMICAL RESISTANCE TEST - ASTM D543 | | | |
| --- | --- | --- | --- |
| Material | Solution | Flex. Strength(PSI) | Stiffness(PSI) |
| Prior Art | none(control) | 3960 | $1.4 \times 10^6$ |
| Prior Art | 5% Acetic Acid | 3480 | $1.3 \times 10^6$ |
| Prior Art | Ethyl Acetate | 430 | $6.0 \times 10^4$ |
| Prior Art | 40% $HNO_3$ | 2800 | $6.9 \times 10^5$ |
| Prior Art | Methanol | 530 | — |
| Prior Art | Conc. $H_2SO_4$ | Degraded | Degraded |
| First Embodiment | none(control) | 5100 | $1.1 \times 10^6$ |
| First Embodiment | 5% Acetic Acid | 4440 | $1.1 \times 10^6$ |
| First Embodiment | Ethyl Acetate | 4550 | $1.4 \times 10^6$ |
| First Embodiment | 40% $HNO_3$ | 5100 | $1.6 \times 10^6$ |

TABLE 1-continued

CHEMICAL RESISTANCE TEST - ASTM D543

| Material | Solution | Flex. Strength(PSI) | Stiffness(PSI) |
|---|---|---|---|
| First Embodiment | Methanol | 4280 | $1.3 \times 10^6$ |
| First Embodiment | Conc. $H_2SO_4$ | Degraded | Degraded |
| Second Embodiment | none(control) | 5560 | $1.3 \times 10^6$ |
| Second Embodiment | 5% Acetic Acid | 4600 | $7.6 \times 10^5$ |
| Second Embodiment | Ethyl Acetate | 3600 | $6.9 \times 10^5$ |
| Second Embodiment | 40% $HNO_3$ | 4400 | $8.1 \times 10^5$ |
| Second Embodiment | Methanol | 1840 | $2.5 \times 10^5$ |
| Second Embodiment | Conc. $H_2SO_4$ | 5400 | $9.8 \times 10^5$ |

Chemical Resistance 21 Day Immersion Test

A twenty-one (21) day immersion test was performed using procedures similar to the seven day ASTM D543 test described above except that immersion time was twenty-one (21) days. Reagents used were ten percent (10%) acetic acid solution, ten percent (10%) hydrochloric acid solution, ten percent (10%) nitric acid solution, ten percent (10%) sulfuric acid solution, twenty-five percent (25%) sodium hydroxide solution and xylene. The samples were tested for weight change resulting from the twenty-one (21) day immersion.

In addition to the prior art sample and the samples made according to the first and second embodiments of the invention as set forth above respecting the "chemical resistance seven day immersion test, five other samples representing additional embodiments of the invention were also tested.

The sample for the third embodiment of the invention was the same as the sample for the second embodiment except that the hardener was ninety-five percent (95%) Versamine I-70 and five percent (5%) Dow Corning Z6020 amino silane, both by weight of hardener, and the resin was eighty-eight percent (88%) bisphenol formaldehyde epoxy and twelve percent (12%) benzyl alcohol. The sample for the fourth embodiment of the invention was identical to the sample for the third embodiment except that methanol replaced the benzyl alcohol. The sample for the fifth embodiment of the invention was identical to the sample for the third embodiment except that ethanol replaced the benzyl alcohol. The sample for the sixth embodiment of the invention was identical to the third embodiment except that furfural alcohol replaced the benzyl alcohol. The sample for the seventh embodiment of the invention was identical to the third embodiment except that isopropyl alcohol replaced the benzyl alcohol.

The results of this test are set forth as percentage weight gain after three weeks of immersion. The weight gain reflects absorption of the immersion solution by the respective samples because of deterioration of the samples. The results for the twenty-one (21) Immersion Test are shown below in Table 2:

TABLE 2

21 DAY IMMERSION TEST WEIGHT GAIN (%)

| Chemical Reagent | Prior Art | 1st Embod | 2nd Embod | 3rd Embod | 4th Embod | 5th Embod | 6th Embod | 7th Embod |
|---|---|---|---|---|---|---|---|---|
| 10% acetic acid | 1.10 | 1.27 | 0.34 | 0.49 | 0.70 | 0.38 | 0.40 | 0.40 |
| 10% hydrochloric acid | 0.26 | 0.24 | 0.24 | 0.20 | 0.40 | 0.21 | 0.33 | 0.27 |
| 10% nitric acid | 0.39 | 0.32 | 0.29 | 0.42 | 0.53 | 0.32 | 0.51 | 0.58 |
| 10% sulfuric acid | 0.25 | 0.21 | 0.20 | 0.20 | 0.42 | 0.14 | 0.31 | 0.18 |
| 25% sodium hydroxide | 0.13 | 0.02 | 0.02 | 0.06 | 1.00 | 0.14 | 0.20 | 0.07 |
| Xylene | 0.45 | 0.27 | 0.02 | 0.03 | 0.01 | 0.04 | 0.06 | 0.01 |

The Falling Ball Test—Navy Spec. Mil-D-3134-A

The samples made according to the first and second embodiments of the invention, as described above, exhibit improved resistance to impact loading, when tested using the falling ball test, compared to known epoxy flooring materials, particularly known bisphenol acetone-based epoxy flooring materials. The falling ball test was derived from Navy flooring specification mil-D-3134-A and determines flooring material, resistance to impact loading, when the flooring material has been applied to steel plates.

The flooring materials were each troweled to form samples approximately ¼ inch thick on ⅜ inch thick clean steel plates. The samples were cured for at least 96 hours, but not more than 336, hours as specified for the test. Two 6 inch samples of each type of flooring material—the prior art and the first and second embodiments of the invention, as set forth above under the "chemical resistance seven day immersion test"—were mounted separately on a solid horizontal base. A 2 lb. steel ball was dropped vertically from a height of 8 feet on to the each sample at the center of each sample. Each sample was subjected to two drops of the steel ball.

To meet the Navy specification, a flooring material must not show any visible signs of chipping, cracking or detachment from the steel plate. Also, no more than 1/16 of an inch permanent indentation is allowed. The test results are shown below in Table 3:

TABLE 3

| Material | Result |
|---|---|
| Prior Art | Cracked and Chipped |
| First Embodiment | Cracked |
| Second Embodiment | Met specification |

Although the hardener and resin components should be in stoichiometric amounts respecting one another, the proportion of combined hardener and resin relative to the overall material composition may vary according to the amount of aggregate component used and the color to be attained. For example, a red coating may require a larger proportion of pigment than a black coating and therefore the overall proportions of hardener and resin would be less for such a red coating than for the black. Such variations in the proportions of combined hardener with resin relative to the overall material composition, to permit desired colorings of the flooring and coating materials, are within the scope of the invention.

We claim:

1. A trowelable, epoxy-based flooring material, exhibiting high impact strength, high chemical resistance and a closed exposed surface after curing, comprising:
   A. a hardener component including:
      i. aliphatic amine, and
      ii. amino silane;
   B. a resin component including:
      i. bisphenol formaldehyde epoxy, and
      ii. monoepoxide and
   C. an aggregate component,
wherein the hardener and the resin are present in stoichiometric proportions.

2. The flooring material of claim 1 wherein said amino silane is present in an amount ranging from about five percent (5%) to about fifteen percent (15%) by weight of the hardener component and said aliphatic amine is present in an amount ranging from about eighty-five percent (85%) to about ninety-five (95%) by weight of the hardener component.

3. The flooring material of claim 1 wherein said bisphenol formaldehyde epoxy is present in an amount ranging from about eighty-eight percent (88%) to about ninety percent (90%) by weight of the resin component and said monoepoxide is present in an amount ranging from about ten percent (10%) to about twelve percent (12%) by weight of the resin component.

4. A trowelable, epoxy-based flooring material, exhibiting high impact strength, high chemical resistance and a closed exposed surface after curing, comprising:
   A. a hardener component including:
      i. about eighty-five percent (85%) to about ninety-five percent (95%) (by weight of hardener) of aliphatic amine, and
      ii. about five percent (5%) to about fifteen percent (15%) (by weight of hardener) of amino silane;
   B. a resin component including;
      i. about eighty-eight percent (88%) to about ninety percent (90%) (by weight of resin) of a bisphenol formaldehyde epoxy, and
      ii. about ten percent (10%) to about twelve percent (12%) (by weight of resin) of monoepoxide; and
   C. an aggregate component;
wherein the hardener and the resin are components present in stoichiometric proportions.

5. The flooring material of claims 1, 2, 3 or 4 wherein said aliphatic amine is selected from the group consisting of diethylene triamine, triethylene tetramine, tetraethylene pentamine, and cycloaliphatic amines.

6. The flooring material of claim 5 wherein said aliphatic amine is devoid of free amine.

7. The flooring material of claim 1 or 4 wherein the monoepoxide comprises monoepoxide selected from the group consisting of cresyl glycidyl ether, butyl glycidyl ether, resorcinyl glycidyl ether and a mixture of $C_{12}$–$C_{14}$ monoepoxides.

8. The flooring material of claim 1 wherein the aggregate component further comprises pigment in an amount effective to change the color of the flooring material from that of the flooring material without pigment.

9. The flooring material of claim 1 or 4 wherein said aggregate component is present in a weight ratio of about five (5.0) to about 8.5 parts aggregate component to one (1.0) part of combined hardener and resin components.

10. The flooring material of claim 9 wherein the ratio of aggregate to said combined components is 6.6 to one (1).

11. The flooring material of claim 1 or 4 wherein said aggregate component comprises, based on the total weight of aggregate:
   A. at least fifty (50) wt. % silica, of which at least about ninety (90) wt. % is between twenty (20) and thirty (30) U.S. Sieve size,
   B. at least forty (40) wt. % silica, of which at least about ninety (90) wt % is between forty (40) and fifty (50) U.S. Sieve size,
   C. less than five (5) wt. % silica, of which at least about ninety (90) wt. % is between one hundred forty (140) and two hundred (200) U.S. Sieve size, and
   D. less than five (5) wt. % silica, of which at least about ninety (90) wt. is three hundred twenty-five (325) or greater U.S. Sieve size.

12. The flooring material of claim 11 wherein the aggregate component contains pigment in an amount effective to change the color of the flooring material from that of the flooring material without pigment.

13. The flooring material of claim 12 wherein the pigment forms no more than about two (2) wt. % of the aggregate component.

14. The flooring material of claim 4 comprising about ninety-five percent (95%) aliphatic amine by weight of hardener component, about five (5%) amino silane by weight of hardener component, about ninety percent (90%) bisphenol formaldehyde epoxy by weight of resin component, and about ten percent (10%) monoepoxide by weight of resin component.

15. A trowelable, epoxy-based flooring material, exhibiting high impact strength, high chemical resistance and a closed exposed surface after curing, comprising:
   A. a hardener component including:
      i. aliphatic amine, and
      ii. amino silane;
   B. a resin component including:
      i. bisphenol formaldehyde epoxy,
      ii. a compound selected from the group consisting of benzyl alcohol, isopropyl alcohol, furfural alcohol, methanol, ethanol, toluene, and xylene; and
   C. an aggregate component, wherein the hardener and resin components are present in stoichiometric proportions.

16. The flooring material of claim 15 wherein said aliphatic amine is present in an amount ranging from about eighty-five percent (85%) to about ninety-five (95%) by weight of hardener component, said amino silane is present in an amount ranging from about five percent (5%) to about fifteen percent (15%) by weight of hardener component, said bisphenol formaldehyde epoxy is present in an amount ranging from about eighty-five percent (85%) to about ninety-five percent (95%) by weight of the resin component, and said benzyl alcohol is present in an amount ranging from about five percent (5%) to about fifteen percent (15%) by weight of the resin component.

17. The flooring material of claim 16 wherein the bisphenol formaldehyde epoxy is about eighty-eight percent (88%) by weight of resin component and said benzyl alcohol is about twelve percent (12%) by weight of resin component.

18. The flooring material of claim 15 or 16 wherein the aggregate comprises by total weight of aggregate component:
  A. at least fifty (50) wt. % silica of which at least ninety (90) wt. % is between twenty (20) and thirty (30) U.S. Sieve size,
  B. at least forty (40) wt. % silica of which at least ninety (90) wt. % is between forty (40) and fifty (50) U.S. Sieve size,
  C. less than five (5) wt. % silica of which at least ninety (90) wt. % is between one hundred forty (140) and two hundred (200) U.S. Sieve size, and
  D. less than five (5) wt. % silica of which at least ninety (90) wt. % is three hundred twenty-five (325) or greater U.S. Sieve size.

19. The flooring material of claim 18 wherein the aggregate component further comprises at least one pigment in an amount effective to change the color of the flooring material from that of the flooring material without pigment.

20. The flooring material of claim 15 or 16 wherein the aliphatic amine is selected from the group consisting of diethylene triamine, triethylene tetraamine, tetraethylene pentamine and cycloaliphatic amines.

21. The flooring material of claim 20 wherein the aliphatic amine is devoid of free amine.

22. The flooring material of claim 19 wherein said pigment forms not more than two (2) wt. % of the aggregate component.

23. The flooring material of claim 15 or 16 wherein the aggregate component is present in a weight ratio of about five (5.0) to about 8.5 parts aggregate component to one (1.0) parts of combined hardener and resin components.

24. The flooring material of claim 23 wherein the ratio of aggregate to said combined components is 6.6 to one (1).

25. An epoxy-based coating material exhibiting high impact strength, high chemical resistance and a closed exposed surface after curing, comprising;
  A. a hardener component including;
    i. about eighty-five percent (85%) to about ninety-five percent (95%) (by weight of hardener) of cycloaliphatic amine, and
    ii. about five percent (5%) to about fifteen percent (15%) (by weight of hardener) of amino silane;
  B. a resin component comprising:
    i. about eighty-eight percent (88%) to about ninety percent (90%) (by weight of resin) of bisphenol formaldehyde epoxy, and
    ii. about ten percent (10%) to about twelve percent (12%) total (by weight of resin) of monoepoxide, and
  C. an aggregate component comprising fumed silica, wherein the hardener and resin components are present in stoichiometric portions.

26. An epoxy-based coating material exhibiting high impact strength, high chemical resistance and a closed exposed surface after curing, comprising;
  A. a hardener component including:
    i. about eighty-five percent (85%) to about ninety-five percent (95%) (by weight of hardener) of cycloaliphatic amine, and
    ii. about five percent (5%) to about fifteen percent (15%) (by weight of hardener) of amino silane;
  B. a resin component including:
    i. about eighty-five percent (85%) to about ninety five percent (95%) (by weight of resin) of bisphenol formaldehyde epoxy, and
    ii. about five percent (5%) to about fifteen percent (15%) (by weight of resin) of benzyl alcohol; and
  C. an aggregate component including fumed silica, wherein the hardener and resin components are in stoichiometric proportions.

27. The coating material of claim 25 or 26 wherein the aggregate component comprises pigment in an amount effective to change the color of the coating material from that of the coating material without pigment.

28. The flooring material of claim 17 wherein the hardener component contains about ninety-five (95) wt. % aliphatic amine including diethylene triamine, and the hardener component contains about five (5) wt. % amino silane.

29. In a trowelable, epoxy-based flooring exhibiting a closed exposed surface after cure including a hardener, a resin and an aggregate, the hardener and resin being present in stoichiometric proportions, the improvement wherever bisphenol formaldehyde epoxy is at least part of the resin.

30. In an epoxy-based coating exhibiting a closed exposed surface after cure, including a hardener and a resin in stoichiometric proportions, the improvement wherever bisphenol formaldehyde epoxy is at least part of the resin.

31. In the flooring of claim 29, the improvement wherein benzyl alcohol is part of the resin.

32. In the coating of claim 30, the improvement wherein benzyl alcohol is part of the resin.

33. A trowelable, epoxy-based flooring material, exhibiting high flexural and impact strength, high chemical resistance and a closed exposed surface after curing, consisting essentially of:
  A. a hardener component consisting essentially of:
    i. aliphatic amine, and
    ii. amino silane;
  B. a resin component consisting essentially of:
    i. bisphenol formaldehyde epoxy, and
    ii. monoepoxides and
  C. an aggregate component, wherein the hardener component and the resin component are present in stoichiometric proportions.

34. A trowelable, epoxy-based flooring material, exhibiting high flexural and impact strength, high chemical resistance and a closed exposed surface after curing, consisting essentially of:
  A. a hardener component consisting essentially of:
    i. about eighty-five percent (85%) to about ninety-five percent (95%) (by weight of hardener) of aliphatic amine, and
    ii. about five percent (5%) to about fifteen percent (15%) (by weight of hardener) of amino silane;
  B. a resin component consisting essentially of:
    i. about eighty-eight percent (88%) to about ninety percent (90%) (by weight of resin) of a bisphenol formaldehyde epoxy, and
    ii. about ten percent (10%) to about twelve percent (12%) (by weight of resin) of monoepoxide; and
  C. an aggregate component; wherein the hardener component and the resin component are present in stoichiometric proportions.

35. A trowelable, epoxy-based flooring material, exhibiting high flexural and impact strength, high chemical resistance and a closed exposed surface after curing, consisting essentially of:
 A. a hardener component consisting essentially of:
  i. aliphatic amine, and
  ii. amino silane;
 B. a resin component consisting essentially of:
  i. bisphenol formaldehyde epoxy,
  ii. a compound selected from the group consisting of benzyl alcohol, isopropyl alcohol, furfural alcohol, methanol, ethanol, toluene, and xylene; and
 C. an aggregate component, wherein the hardener and resin components are present in stoichiometric proportions.

36. The flooring material of claim 35 wherein said aliphatic amine is present in an amount ranging from about eighty-five percent (85%) to about ninety-five (95%) by weight of hardener component, said amino silane is present in an amount ranging from about five percent (5%) to about fifteen percent (15%) by weight of hardener component, said bisphenol formaldehyde epoxy is present in an amount ranging from about eighty-five percent (85%) to about ninety-five percent (95%) by weight of the resin component, and said benzyl alcohol is present in an amount ranging from about five percent (5%) to about fifteen percent (15%) by weight of the resin component.

37. An epoxy-based coating material exhibiting high flexural and impact strength, high chemical resistance and a closed exposed surface after curing, consisting essentially of:
 A. a hardener component consisting essentially of:
  i. about eighty-five percent (85%) to about ninety-five percent (95%) (by weight of hardener component) of cycloaliphatic amine, and
  ii. about five percent (5%) to about fifteen percent (15%) (by weight of hardener component) of amino silane;
 B. a resin component consisting essentially of:
  i. about eighty-eight percent (88%) to about ninety percent (90%) (by weight of resin component) of bisphenol formaldehyde epoxy, and
  ii. about ten percent (10%) to about twelve percent (12%) total (by weight of resin component) of monoepoxide and
 C. an aggregate component consisting essentially of fumed silica, wherein the hardener and resin components are present in stoichiometric proportions.

38. An epoxy-based coating material exhibiting high flexural and impact strength, high chemical resistance and a closed exposed surface after curing consisting essentially of:
 A. a hardener component consisting essentially of:
  i. about eighty-five percent (85%) to about ninety-five percent (95%) (by weight of hardener component) of cycloaliphatic amine, and
  ii. about five percent (5%) to about fifteen percent (15%) (by weight of hardener component) of amino silane;
 B. A resin component consisting essentially of;
  i. about eighty-five percent (85%) to about ninety-five percent (95%) (by weight of resin component) of bisphenol formaldehyde epoxy, and
  ii. about five percent (5%) to about fifteen percent (15%) (by weight of resin component) of benzyl alcohol; and
 C. an aggregate component consisting essentially of fumed silica,
wherein the hardener and resin components are present in stoichiometric proportions.

39. A trowelable epoxy-based material exhibiting high flexural and impact strength, high chemical resistance and a closed exposed surface after curing, consisting essentially of:
 a. hardener consisting essentially of:
  i. aliphatic amine; and
  ii. amino silane; and
 b. resin consisting essentially of:
  i. bisphenol formaldehyde epoxy; and
  ii. monoepoxides;
wherein the hardener and the resin are in stoichiometric proportions.

40. The material of claim 39 further comprising aggregate in an amount sufficient to provide abrasion-resistance to a desired degree.

41. A trowelable, epoxy-based material exhibiting high flexural and impact strength, high chemical resistance and a closed exposed surface after curing, consisting essentially of:
 a. hardener consisting essentially of:
  i. aliphatic amine; and
  ii. amino silane;
 b. resin consisting essentially of:
  i. bisphenol formaldehyde epoxy;
  ii. a compound selected from the group consisting of benzyl alcohol, isopropyl alcohol, furfural alcohol, methanol, ethanol, toluene, and xylene;
wherein the hardener and resin are in stoichiometric proportions.

42. The material of claim 41 further comprising aggregate in an amount sufficient to provide abrasion-resistance to a desired degree.

* * * * *